June 15, 1965   J. TELLERMAN   3,189,849
TORSIONAL SONIC WIRE DELAY LINE
Filed April 2, 1962

*INVENTOR.*
Jacob Tellerman
BY S.C. Yuter
ATTORNEY

United States Patent Office 3,189,849
Patented June 15, 1965

3,189,849
TORSIONAL SONIC WIRE DELAY LINE
Jacob Tellerman, Bayside, N.Y., assignor to Tempo Instrument Incorporated, Plainview, N.Y., a corporation of New York
Filed Apr. 2, 1962, Ser. No. 184,141
6 Claims. (Cl. 333—30)

This invention relates to sonic wire delay lines, and relates particularly to an improved delay line combination in which an improved form of transducer is provided and utilized for injecting a pulse into the line at one end as a transmitter and for detecting and transducing the pulse at the other end of the line as a receiver.

The conventional fundamental sonic wire delay line is the longitudinal delay line. In this approach, a longitudinal strain pulse is launched by a magnetostrictive transducer on one end and is picked up by a magnetic strain sensitive transducer on the other end. The time delay obtained is the time that the strain pulse takes to travel from one end to the other and is a function of the sonic velocity in the delay material utilized.

The conventional transmitter is disposed at one end of the wire and consists essentially of a coil that induces a change of magnetic field in an adjacent short length of the magnetostrictive wire. This causes a change of length in the magnetostrictive material exposed to the magnetic field and a sonic strain pulse is launched. At the receiver a similar coil is disposed with a bias magnet that magnetizes a short length of the wire. When the strain pulse arrives at the receiver, the wire being also sensitive to strain so that it changes magnetic permeability with strain, the magnetic field coupled by the coil changes and hence a voltage is induced in the coil. The materials conventionally used in the delay medium are usually pure nickel or nickel iron alloys that display both magnetostrictive properties and magnetic strain sensitivity.

More recently, in the above type of wire delay line, the practice has changed to use torsional rather than longitudinal sonic waves. The torsional approach introduces less dispersion and hence can provide delays over a wider bandwidth of frequencies with less distortion. Also, the torsional mode permits physically smaller lines to be made due to the fact that torsional waves travel approximately at six-tenths (0.6) the velocity compared to longitudinal waves.

Such conventional torsional lines utilized longitudinal transducers coupled on each end to the torsional delay wire by a "mode transformer" and hence the torsional wire does not need to be magnetostrictive or ferromagnetic. This permits the utilization of any desired materials, such as, for instance, alloys that are extremely stable in their delay vs. temperature characteristics.

The mode transformer in such conventional torsional lines consisted of magnetostrictive transducers welded transversely to the delay wire through a longitudinal tape through which a strain pulse would be applied to the delay wire to cause a twisting strain on that delay wire. Thus, in that prior torsional type of delay line, the strain pulse was produced in an element separate from the delay wire and then transferred to the delay wire.

An object of this invention is to provide a delay line in which a strain pulse is introduced as a torsional effect directly into a delay line and from which the pulse is derived directly from the line.

Another object of this invention is to provide a delay line having a magnetically biased short input region into which a voltage pulse is directly injected as a signal, and having a magnetically biased output region from which a voltage pulse is directly extracted as a signal.

Another object of the invention is to provide a sonic delay line with an input and an output transducer fixedly positioned or welded in place to provide a rugged construction in which the transducers will not move readily in response to vibrations.

Another object of the invention is to provide a delay line in which a portion of the line itself is utilized as an input transducer for injecting a signal pulse and a similar portion as an output transducer for detecting a signal pulse transmitted from the input transducer portion.

In the present invention the torsional force effect is utilized but the transducers that are utilized herein introduce the torsional wave effects directly into and receive them directly from the delay line.

The phenomenon that is utilized in the present invention is the fact that a ferromagnetic rod exhibits a twisting motion when it is exposed to a magnetic field both along the axis of the rod and in the circumference of the rod. This effect is commonly referred to as the Wiedemann Effect. Now, if a small magnet is used to provide an axial field in a ferromagnetic wire, and a current is also caused to flow through the wire in a section that is magnetically biased by the axial field of the magnet, the current will induce a circumferential or circular field in that section of the wire and hence a twisting stress will be produced and a stress pulse launched through the wire.

A similar arrangement is utilized for the output signal transducer. When a strain pulse arrives, it changes the bias flux induced in the wire by the flux field of a permanent magnet or electromagnet, and because the stress pulse is torsional, a signal voltage is induced along the axis of the wire (Wertheim Effect) that can be picked off by small electrical contacts that engage the wire. The advantages of this invention are as follows:

(1) Simple electrical contacts can be used at the input and the output transducers providing low cost and simple construction. These contacts can be fixedly positioned or even welded in place on the pulse producing transducer rod.

(2) Transducers cannot move under vibration stresses, such as has been the case with floated coils on previously used transducers. Construction is extremely rugged.

(3) Delay lines made by this method can be made very small and light in weight with simple mechanical damps moulded in place on each end of the line.

(4) Additional taps can be easily added with almost no mechanical losses in sonic energy. These taps can be accurately and selectively located and just as ruggedly constructed in application to the pulse generating transducer rods.

If the transducer material desired is different from the delay wire medium, transducer wire sections can be easily butt welded to the delay line medium. Good engineering compromises for best transducer efficiency and most stable delay line medium can be made.

Also, where efficiency is to be improved, for establishing a maximum strain effect in response to the magnetic field intensity of the input pulse energy, a D.C. current through the transducer elements, alone, in both transducers, or, for the sake of convenience, through the whole length of the delay line wire can provide an appropriate value of circular field bias.

Such bias would raise the magnetic field intensity of the circular field of the input signal to a value which induces proportionately high value of magnetostrictive strain.

The use of solid wire is not compulsory, since tubular construction can be used, where appropriate, to minmize eddy current losses.

Similarly, other materials may be utilized for the transmission of the sonic pulse, to serve as a transmission line, between a transmitting transducer and a receiving transducer, both suitably coupled to the transmission line.

In such a modification, for example, a material such as a glass rod may be utilized as the transmission line for the sonic pulses or waves, with transducers of the type contemplated herein supported on the glass rod at a desired spacing and suitably accoustically coupled to the glass rod for transfer of energy between each transducer and the glass rod.

In all of such devices suitable damping material is utilized at the ends of the transmission line wire or material to serve as non-reflective terminations for the transmission line.

The general principles of the invention are explained in more detail in the following specification, taken in connection with the accompanying drawings, in which FIGURE 1 is a schematic diagram of a sonic delay line embodying the principles of this invention and illustrating the application of one embodiment of the improved transducer and transducer arrangement utilized herein;

Figure 1:
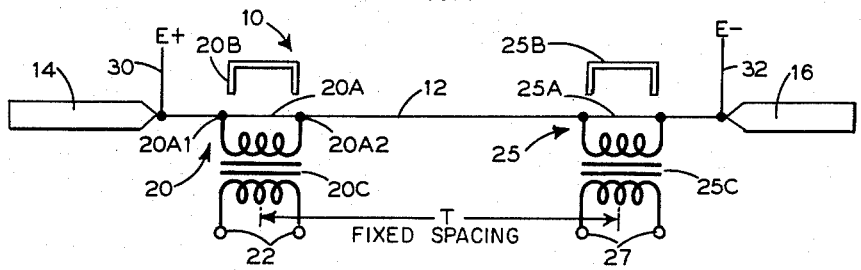

As shown in FIGURE 1, a sonic transmission line 10 comprises a sonic wave conductor 12 which may be in the form of a wire supported between two brackets or supports 14 and 16 which also serve as suitable damps or absorbers of sound waves transmitted by the wire 12, in order to prevent any reflections from the terminals of the wire 12 back into the wire from the points of support.

In one form of construction the entire wire 12 may be of ferromagnetic material. The delay line 10 then comprises additionally a transmitter transducer 20 which serves to inject the input signal into the line, and comprises further a receiver or output transducer 25 which serves to detect the signal pulse introduced into the line by the transmitter 20 and carried by the line to the region of the receiver.

The transmitter transducer 20 and the receiver transducer 25 are essentially similar. The input transducer 20 primarily consists of a transducer element 20A, a polarizing magnet 20B and an electrical impedance matching device 20C shown herein schematically simply as a transformer.

The transducer element 20A may be part of the transmission wire 12 or it may be a separate element which may then be effectively coupled into the circuit of the transmission wire 12 for sonically transferring and transmitting pulses to the wire 12 as generated in the transducer element 20A.

In operation, the input or transmitter transducer element 20A is magnetized or biased axially by the magnetic flux from the magnet 20B and a current pulse is then injected into the short section of the transducer 20A from an input circuit 22 through the matching device 20C shown schematically as the transformer 20C. The current injected into the transducer section 20A generates a circular magnetic flux field which reacts with the axial flux field to develop a torsional force effect in the short transducer section 20A. That torsional or twisting force introduces a strain which is then transmitted to the other parts of the wire 12 and continues in both directions to the two damping brackets 14 and 16. The sonic pulse that is transmitted to the damping support 14 is there damped and has no further effect. The sonic pulse transmitted in the other direction, however, moves to the end of the wire 12 at the damping support 16 and in traversing the wire in that direction reacts on the receiver transducer 25.

The transducer 25 similarly comprises a transducer section 25A, a magnet 25B and a matching device shown as a transformer 25C suitably connected to an output circuit 27.

The wire 12 in the embodiment of FIGURE 1 is ferromagnetic and is therefore sensitive to a strain pulse, to which it responds by a change in its permeability. The magnetic flux from the magnet 25B is normally constant so long as the permeability of the section 25A is unaffected and unchanged. However, upon strain reaction to the traversing sonic pulse the change in permeability of the transducer section 25A causes a change in the flux field introduced axially by the magnet 25B, with consequent generation of a small voltage between the two ends of the short transducer section 25A to which the transformer winding is shown connected.

The signal voltage thus generated at the receiving transducer 25 may then be supplied to a suitable output circuit to be amplified and indicated or recorded or otherwise utilized.

The transducer elements 20A and 25A may be made of any desired effective length by spacing the terminals 20–A1 and 20–A2 of the transducer element a given or desired distance that will control and limit the length of the applied circular magnetic flux field that is to react on the axial polarizing field to establish the twisting force. The effective length of a pulse can thus be controlled. The known characteristics of the wire 12 as a sonic transmitting medium can then be utilized to predetermine the distance between the transmitting transducer 20 and the receiving transducer 25 to predetermine and control the time delay or travel time T of a pulse between the transmitting transducer 20 and the receiving transducer 25, as indicated by the spacing between transducers in FIGURE 1.

By use of a matching device schematically shown here as the transformer 20C the transducer element 20A may be coupled to the input circuit for most efficient transfer of energy. Similarly, in the output circuit the matching transformer 25C serves the same purpose.

Since the part of the transmission line between the two transducers is utilized solely as a sonic transmitting medium, the material and the construction of that transmitting medium may be varied, and need not be the same as the material or structure of the transducer elements. Thus, as previously indicated, the transducer material may be selected for maximum efficiency as a transducer to produce a sonic pulse, and the delay line medium may be selected according to the best technical characteristics that may be desired and available for the pulse transmitting function.

Figure 2:
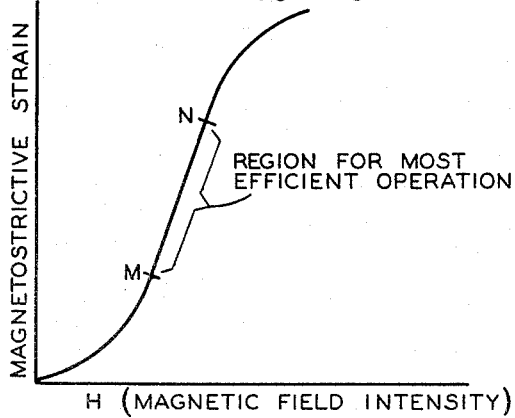
FIGURE 2 is a graph showing the relation of the magnetostriction strain to the magnetic field intensity.

As already indicated, in another embodiment, where a continuous metallic line is employed, a continuous direct current may be utilized through the length of the line to provide an initial bias for the circular magnetic field that will be generated by the applied current pulse. Thus, as shown in FIGURE 2, an initial circular magnetic field bias by such bias current will maintain a steady state field intensity corresponding to the point M on the graph.

The signal pulse current will add its circular field intensity to that of the bias current, and will be most efficient within the range from M to N, since in that range the ratio of induced strain to inducing field intensity is maximum.

Such biassing current may be applied directly to the transducer elements 20A and 25A at or beyond the points of the terminal elements of the transducer 20–A1 and 20–A2, or the bias current may be applied to the entire circuit of the wire 12 and the transducers as by the circuit conductors 30 and 32 with the current supplied from a circuit having an appropriate voltage labeled E plus and E minus. Obviously, where more convenient, the bias current may be fed to the conductor 12 beyond the damps 14 and 16.

Where high frequency response is required, the wire 12 need not be a solid wire but can be made of tubular form to reduce eddy current and hysteresis effects, or losses. Tubular sections may be used only at the transmitter and receiver ends, and generally will be used to improve only the high frequency efficiency of transducers, and then mechanically matched to the solid wire delay medium.

Figure 3:
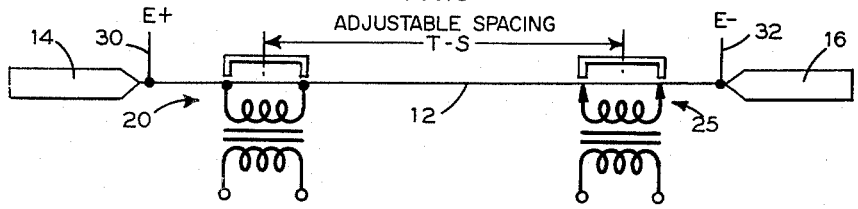
FIGURE 3 is a schematic diagram of a delay line showing another embodiment in which the transducers are selectively and adjustably positionable to control the pulse dimension and the spacing between the transmitter and the receiver.

In the embodiment, as shown in FIGURE 3, the transducers may be selectively positioned along the delay wire to a selected spacing to establish a selective T-S between the transducers. The coupling terminals for the transducers may take any convenient form to permit easy adjustment and tight clamping to establish good electrical and mechanical coupling.

Figure 4:
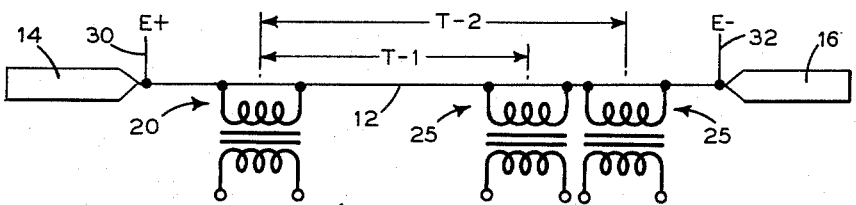
FIGURE 4 is a schematic diagram similar to that of FIGURE 3, and shows an embodiment in which a plurality of transmitter and receiver transducers may be employed for selective positioning along the line to provide variable delays.

In FIGURE 4 is shown a feature of the invention, which permits the selective positioning and coupling of FIGURE 3 to be employed for applying additional transducers as taps on the delay wire 12 to derive a plurality of time delay intervals, indicated herein by only two intervals T-1 and T-2. It is intended to teach herein the use of a plurality of transmitting transducers or a plurality of receiving transducers, or both.

Figure 5:
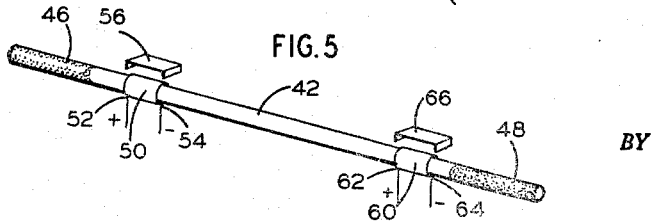
FIGURE 5 is a similar schematic and diagrammatic arrangement of a sonic delay line utilizing a non-metallic sonic transmission element.

In another modification of the invention, as shown in FIGURE 5, the sonic transmitting device may employ a non-metallic medium such as a glass rod 42 supported between two damping brackets 46 and 48. The transducer input element may be formed or deposited on the glass as a ferromagnetic film 50 with end terminals 52 and 54 suitably welded to the film to provide a current-conducting path of a selected length. The terminals may be in the form of end rings to establish an even current distribution. A magnet 56 provides the axial polarization as in the modification of FIGURE 1. A similar output transducer 60 is provided with output terminals 62 and 64 and is arranged to be magnetically polarized by a magnet 66.

A sonic pulse generated at the input transducer 50 travels through the glass rod 42 according to the characteristics of the glass rod 42 and reaches the transducer 60 a corresponding time interval later, to establish a torsional strain in the transducer 60 which will change the magnetic flux field from the magnet 66 sufficiently to generate a potential difference between the two terminals 62 and 64, which may then be supplied to an external circuit for amplification and appropriate utilization.

A feature of the invention is that, by welding the terminals directly to the ends of the transducer element which is to be subjected to a torsional stress, the characteristics of the transducer may be kept constant over a long period of use, without suffering the disadvantages of present conventional devices in which shifting occurs between the force-producing transducing components and the delay wire into which those forces are magnetically injected.

A further advantage of the construction shown herein is that the dimension of the sonic pulse can be definitely controlled and related to the transmission characteristics of the transmission line medium.

As in the system shown in FIGURE 4, a plurality of transducers may be employed in the delay line of FIGURE 5.

It is contemplated that the invention as disclosed herein may be modified in various ways in its application to various materials and environments, without departing from the spirit and scope of the invention as defined in the claims.

What is claimed is:
1. A torsional sonic delay line comprising
   an elongated member of a material capable of transmitting a sonic disturbance;
   means for supporting said elongated member at both ends as terminations to prevent reflections of any transmitted disturbance;
   an individual ferromagnetic element supported at each end of and integrated with said elongated member for transferring a sonic pulse into or out of said elongated member;
   means for axially magnetically energizing each ferromagnetic element;
   means directly electrically connected to said elongated member for injecting a current pulse into one of said ferromagnetic elements to generate a flux field to react on said axially energized ferromagnetic element to create a sonic pulse to traverse said elongated member;
   and electromagnetic means for detecting said pulse at the other of said ferromagnetic elements.
2. A torsional sonic delay line comprising:
   a delay wire of ferromagnetic material having a transmitting zone and a receiving zone both having magnetic axial bias;
   means directly electrically conductively connected to said transmitting zone for introducing a torsional pulse at the transmitting end by introducing a current pulse directly and conductively into said transmitting zone;
   and means directly electrically conductively connected to said receiving zone for detecting the torsional pulse at the receiving end;
   said pulse-introducing means including means for establishing said axial magnetic bias field in the transmitting zone and means for introducing a current into the transmitting zone of the wire to establish a peripheral magnetic flux field to react with the axial bias to generate the torsional pulse in the delay wire;
   said current introducing means including a pair of terminals fixed to the delay wire, a current source and means for matching the source to the section of delay line between the pair of terminals.
3. A torsional sonic delay line, as in claim 2, in which the terminals are welded to the delay wire at points spaced a given distance on the delay wire to define a dimension of the pulse to be injected.
4. A sonic delay line operable in the torsional mode and comprising
   an elongated sonic delay wire which at least at two spaced apart zones, defined as the transmitting and receiving zones, is formed of a ferromagnetic material at least on the exterior surface of the delay wire,
   a direct current voltage means,
   means directly connecting said direct current voltage means to said wire for establishing at each of the respective zones a magnetic bias field oriented in the axial direction of the wire,
   a transmitting and a receiving transducer, respectively located in the like-named zones, each transducer comprising the ferromagnetic material of its zone, and a pair of electric terminals which are spaced apart from one another a given distance to define a dimension of the pulse to be injected and are electrically connected directly to the ferromagnetic material in the respective zone, so as to provide an electric conductive path from one such terminal via the ferromagnetic material to the other such terminal, whereby when a pulse of electric current passes from one transmitting zone electric terminal to the other via the respective ferromagnetic material, a circumferential magnetic field is set up about said wire in the transmitting zone, causing a torsional pulse propagation through the wire from the transmitting zone to the receiving zone to produce a delayed electric signal at the receiving zone electric terminals.

5. A torsional sonic delay line comprising
a delay means having a ferromagnetic element adjacent one end and co-axial with said delay means;
means for magnetically axially biasing said ferromagnetic element;
means for introducing an electric current into said ferromagnetic element to flow axially therethrough for generating a torsional pulse therein for transmission through the delay means;
and means at the other end of the delay means for detecting such sonic pulse and for generating an electric signal characteristic of said pulse, said detecting means including a ferromagnetic detecting element co-axial with and adjacent the other end of the delay means;
means normally magnetically biasing said ferromagnetic detecting element;
and means responsive to a voltage change due to a change in the magnetic bias in said ferromagnetic detecting element upon arrival of a sonic pulse from said current-traversed ferromagnetic element,
said delay means being formed of a non-metallic material, and said ferromagnetic elements being in the form of films surrounding and forming a unitary structure with the non-metallic material.

6. A sonic delay line according to claim 5, wherein the non-metallic material is glass.

References Cited by the Examiner
UNITED STATES PATENTS

| | | | |
|---|---|---|---|
| 2,612,603 | 9/52 | Nicholson et al. | 333—30 |
| 2,760,165 | 8/56 | Sullivan | 333—30 |
| 2,790,160 | 4/57 | Millership | 333—30 |
| 2,814,793 | 11/57 | Bonn | 333—30 |
| 2,846,654 | 8/58 | Epstein | 333—30 |
| 2,863,120 | 12/58 | Powell | 332—9 |
| 2,913,680 | 11/59 | Porter et al. | 333—30 |
| 2,926,217 | 2/60 | Powell | 333—30 |
| 3,016,524 | 1/62 | Edmunds | 333—30 |
| 3,020,416 | 2/62 | Van Vechten | 333—30 |
| 3,051,916 | 8/62 | Rothbart | 333—30 |
| 3,078,426 | 2/63 | Foundas. | |
| 3,080,537 | 3/63 | Tenten | 333—30 |
| 3,127,578 | 3/64 | Long | 333—30 |
| 3,129,395 | 4/64 | Mason | 333—30 |

OTHER REFERENCES

Electronics, "Digital Function Generator," Jan. 12, 1962, pages 62–65.

Brodburd Elec. Communication, vol. 28, pages 46–53, March 1951.

HERMAN KARL SAALBACH, *Primary Examiner.*